(12) United States Patent
Burry et al.

(10) Patent No.: US 7,204,475 B1
(45) Date of Patent: Apr. 17, 2007

(54) VEHICLE LIFT FOR MOTORCYCLES

(75) Inventors: James M. Burry, Troutman, NC (US);
Daniel R. Seymour, Mooresville, NC (US)

(73) Assignee: BISS Product Development LLC, Troutman, NC (US)

( * ) Notice: Subject to any disclaimer, the term of this patent is extended or adjusted under 35 U.S.C. 154(b) by 0 days.

(21) Appl. No.: 11/535,184

(22) Filed: Sep. 26, 2006

Related U.S. Application Data

(60) Provisional application No. 60/774,115, filed on Feb. 16, 2006.

(51) Int. Cl.
*B60P 1/16* (2006.01)
(52) U.S. Cl. ....................................... 254/88
(58) Field of Classification Search .................. 254/88, 254/1, 131, 120; 211/17, 22
See application file for complete search history.

(56) References Cited

U.S. PATENT DOCUMENTS

| | | | | |
|---|---|---|---|---|
| 2,471,756 | A * | 5/1949 | Larson | ......................... 254/88 |
| 4,077,607 | A * | 3/1978 | Lovelady | ...................... 254/88 |
| 4,180,253 | A | 12/1979 | Ivers et al. | |
| 5,518,224 | A | 5/1996 | Anderson | |
| 5,769,396 | A | 6/1998 | Tischendorf | |
| 5,979,878 | A | 11/1999 | Blankenship | |
| 6,802,493 | B2 | 10/2004 | Lance | |
| 6,981,694 | B2 | 1/2006 | Carnahan | |
| 2004/0099851 | A1 | 5/2004 | Carnahan | |

* cited by examiner

*Primary Examiner*—Robert C. Watson
(74) *Attorney, Agent, or Firm*—Hammer & Hanf, P.C.

(57) ABSTRACT

A vehicle lift for a motorcycle includes a base, a ramp, and a lifting mechanism. The base has a first end and a second end. The lifting mechanism has a first end and a second end. The ramp has an end and a connection point. The connection point of the ramp is pivotally connected to the first end of the base. The first end of the lifting mechanism is pivotally connected to the second end of the base. The second end of the lifting mechanism is pivotally connected to the end of the ramp. The vehicle lift is in a lowered position when the lifting mechanism is collapsed. The vehicle lift is in a raised position when the lifting mechanism is extended.

20 Claims, 5 Drawing Sheets

VEHICLE LIFT FOR MOTORCYCLES

RELATED APPLICATION

This application claims the benefit of U.S. Provisional application Ser. No. 60/774,115 filed Feb. 16, 2006.

FIELD OF INVENTION

The instant application relates to a vehicle lift for a motorcycle.

BACKGROUND OF THE INVENTION

A vehicle lift is a device used to lift one or more wheels of a vehicle off the ground. Vehicle lifts come in many different sizes, shapes and forms. Vehicle lifts may be used for many different reasons, such as, parking, maintenance, storage, cleaning, display, etc. Vehicle lifts may be used to lift many types of vehicles and are especially suitable for lifting small vehicles like a motorcycle.

A motorcycle is a two-wheeled motorized vehicle. In order to park a motorcycle, for storage, maintenance, cleaning, etc., a device for holding the motorcycle upright is required. Most motorcycles are equipped with a kickstand. A kickstand is a spring loaded bar mounted under the motorcycle for holding the motorcycle upright. However, kickstands do not provide a great deal of stability and may not be useful when repairing, cleaning or even storing the motorcycle. Thus, a device is needed for holding a motorcycle upright that is stable.

In some situations it may be desirable to lift the rear and/or front wheel of the motorcycle off the ground. For example, the rear or front may be lifted off the ground for engine repair and testing. A motorcycle kickstand will not lift the rear or front of the motorcycle off the ground. Thus, there is a need for a device for lifting the rear or front of a motorcycle off the ground.

A dirt bike, or a 'trail bike', is a lightweight motorcycle designed for use on rough surfaces, such as dirt roads or trails. Dirt bikes may not be equipped with a kickstand for safety concerns. For example, the kickstand could become dislodged from its horizontal position from impact forces (or from some object on the ground) causing injury to the rider and/or the bike. Thus, there is a need for a device for holding a dirt bike upright.

A popular use for dirt bike riders is to compete in dirt bike races. Competitive dirt bike riding requires constant changing and tweaking of a dirt bike engine in short periods of time. In order to change or tweak a dirt bike engine, it is usually necessary to raise the rear and/or front wheel of the motorcycle quickly. A common practice for parking dirt bikes, or for lifting the rear or front of the dirt bike, is to use a crate or box. Using a crate or box requires the rider to lift the dirt bike up off the ground and quickly place the frame of the dirt bike onto the crate. The action of lifting the dirt bike onto the crate requires a great deal of strength and skill. Thus, there is a need for an easy to use device for lifting the rear or front of a dirt bike.

Competitive dirt bike riders are constantly on the road and changing venues. Thus, there is also a need for a light weight and portable device for holding a dirt bike upright stably and lifting the rear and/or front of the dirt bike.

The instant invention is designed to address all of these problems.

SUMMARY OF THE INVENTION

The instant invention is a vehicle lift for lifting a motorcycle. The vehicle lift includes a base, a ramp, and a lifting mechanism. The base has a first end and a second end. The lifting mechanism has a first end and a second end. The ramp has an end and a connection point. The connection point of the ramp is pivotally connected to the first end of the base. The first end of the lifting mechanism is pivotally connected to the second end of the base. The second end of the lifting mechanism is pivotally connected to the end of the ramp. The vehicle lift is in a lowered position when the lifting mechanism is collapsed. The vehicle lift is in a raised position when the lifting mechanism is extended.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
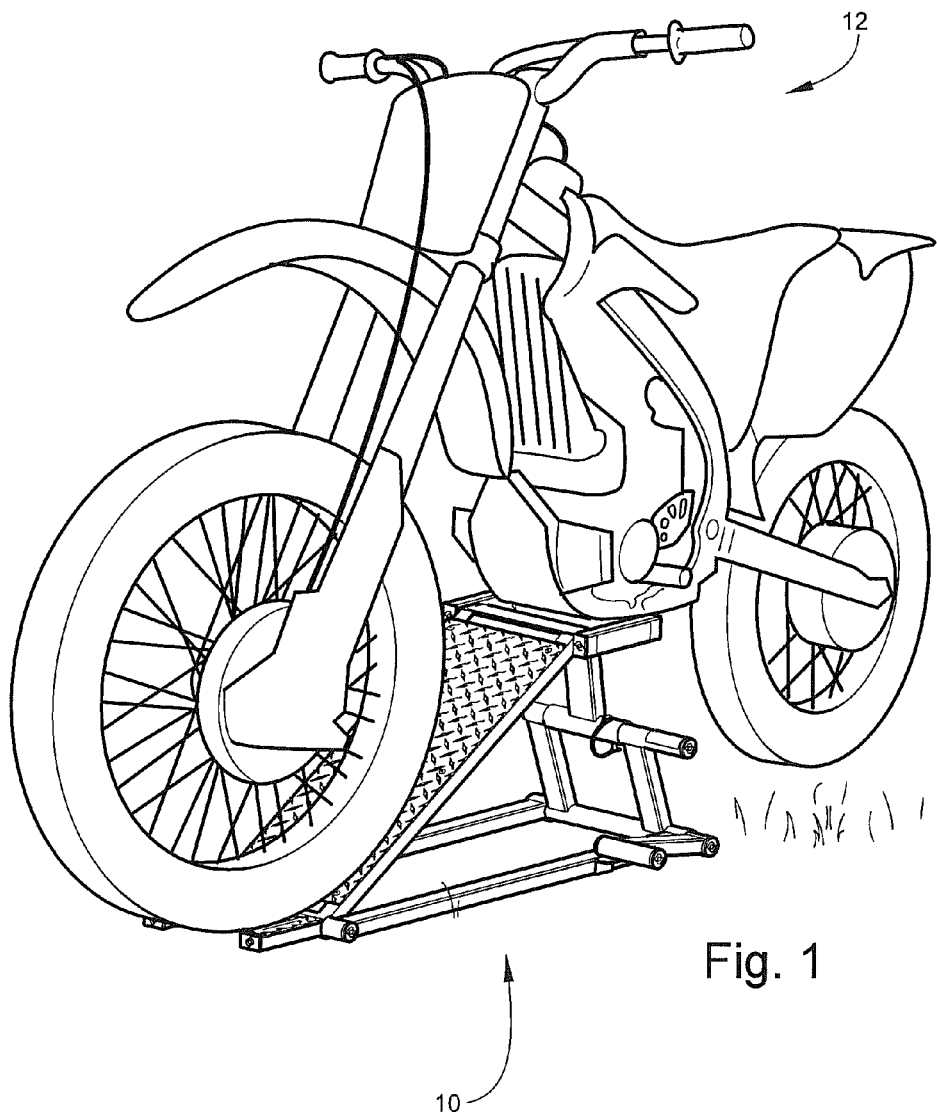
FIG. 1 is an environmental view of one embodiment of the vehicle lift.

Referring to the drawings, wherein like numerals indicate like elements, there is shown in FIG. 1 an embodiment of a vehicle lift 10. Vehicle lift 10 may be for lifting any vehicle, including but not limited to, a motorcycle 12, an all terrain vehicle, etc. Vehicle lift 10 may be for holding motorcycle 12 upright in a stable position. Vehicle lift 10 may lift motorcycle 12 so that the rear and/or front of motorcycle 12 may be off the ground and free to rotate. Vehicle lift 10 may be for lifting motorcycle 12 for any reason, including but not limited to, parking, storage, maintenance, cleaning, etc. Vehicle lift 10 may have a lowered position 20 (see FIG. 2), a raised position 22 (see FIG. 3), and an intermediate position 56 (see FIG. 4). Vehicle lift 10 may include base 14, ramp 16, and lifting mechanism 18 (see FIG. 5).

Motorcycle 12 may be any motorcycle, including but not limited to, a dirt bike (see FIG. 1).

Figure 2:
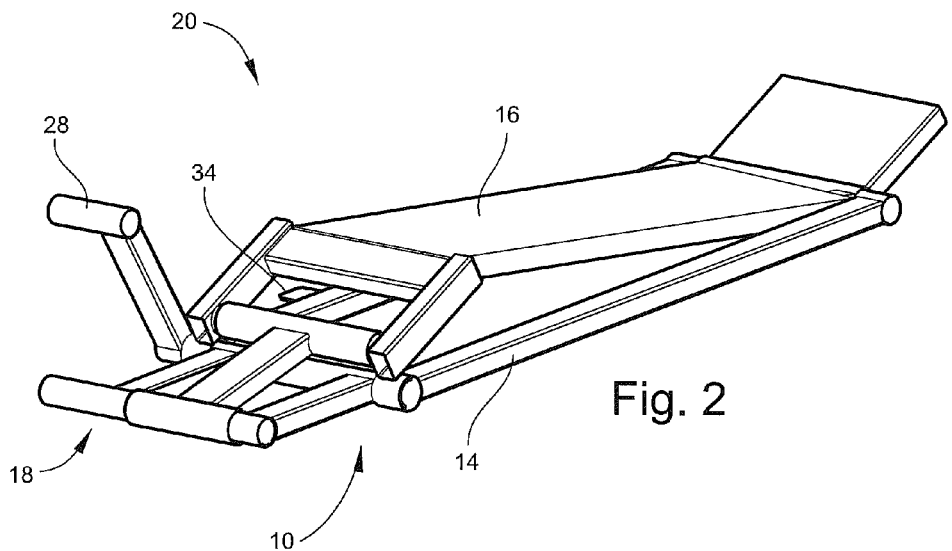
FIG. 2 is an isometric view of one embodiment of the vehicle lift in the lowered position.

Lowered position 20 may be the lowered position of vehicle lift 10 (see FIG. 2). Lowered position 20 may be a position where motorcycle 12 may roll on to vehicle lift 10 (see FIG. 6a).

Raised position 22 may be the raised position of vehicle lift 10 (see FIG. 2b). Raised position 22 may be a position where the rear and/or front of motorcycle 12 may be lifted off the ground and free to rotate (see FIG. 6c).

Figure 4:
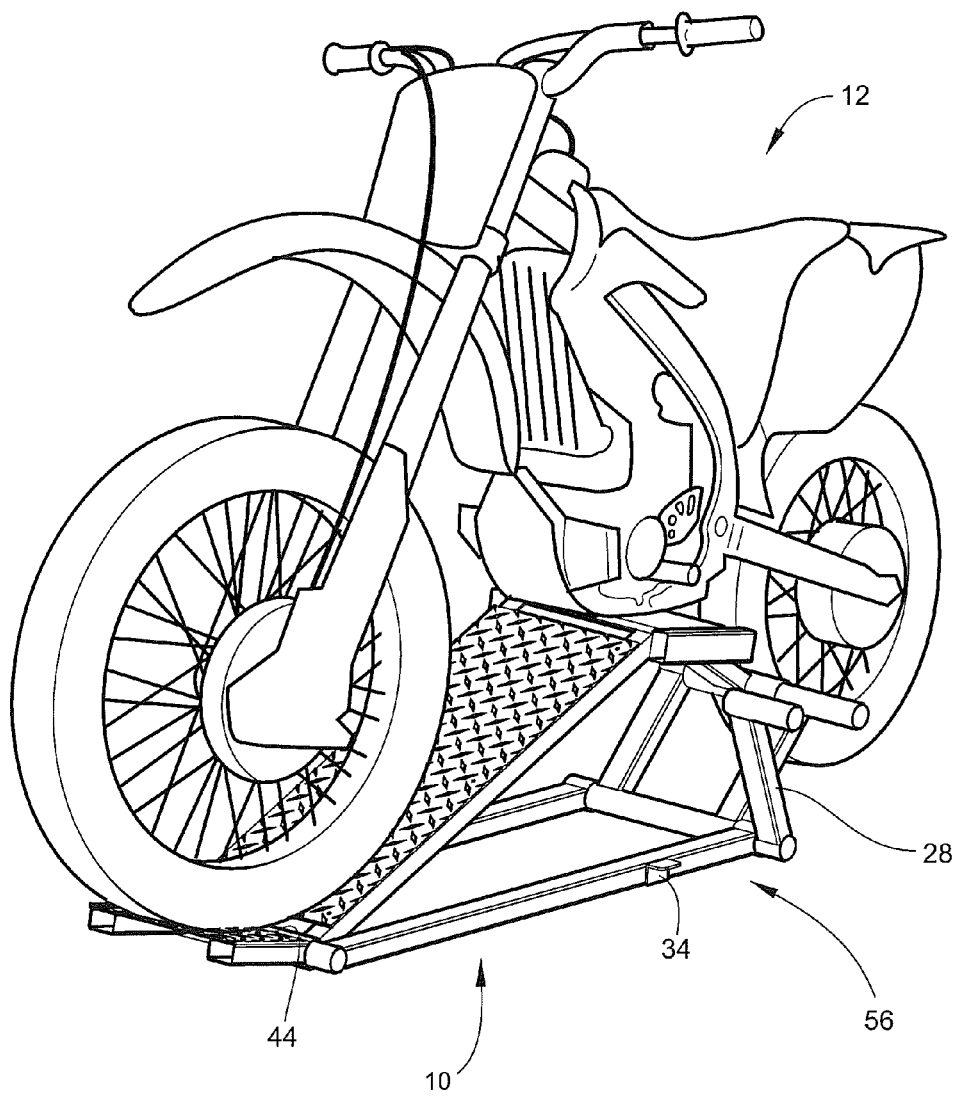
FIG. 4 is an environmental view of one embodiment of the vehicle lift in the intermediate position.

Intermediate position 56 may be an intermediate position between lowered position 20 and raised position 22 (see FIG. 4). Intermediate position 56 may be the position where ramp 16 may contact the undercarriage of motorcycle 12 without lifting the rear or front of motorcycle 12 off the ground.

Figure 5:
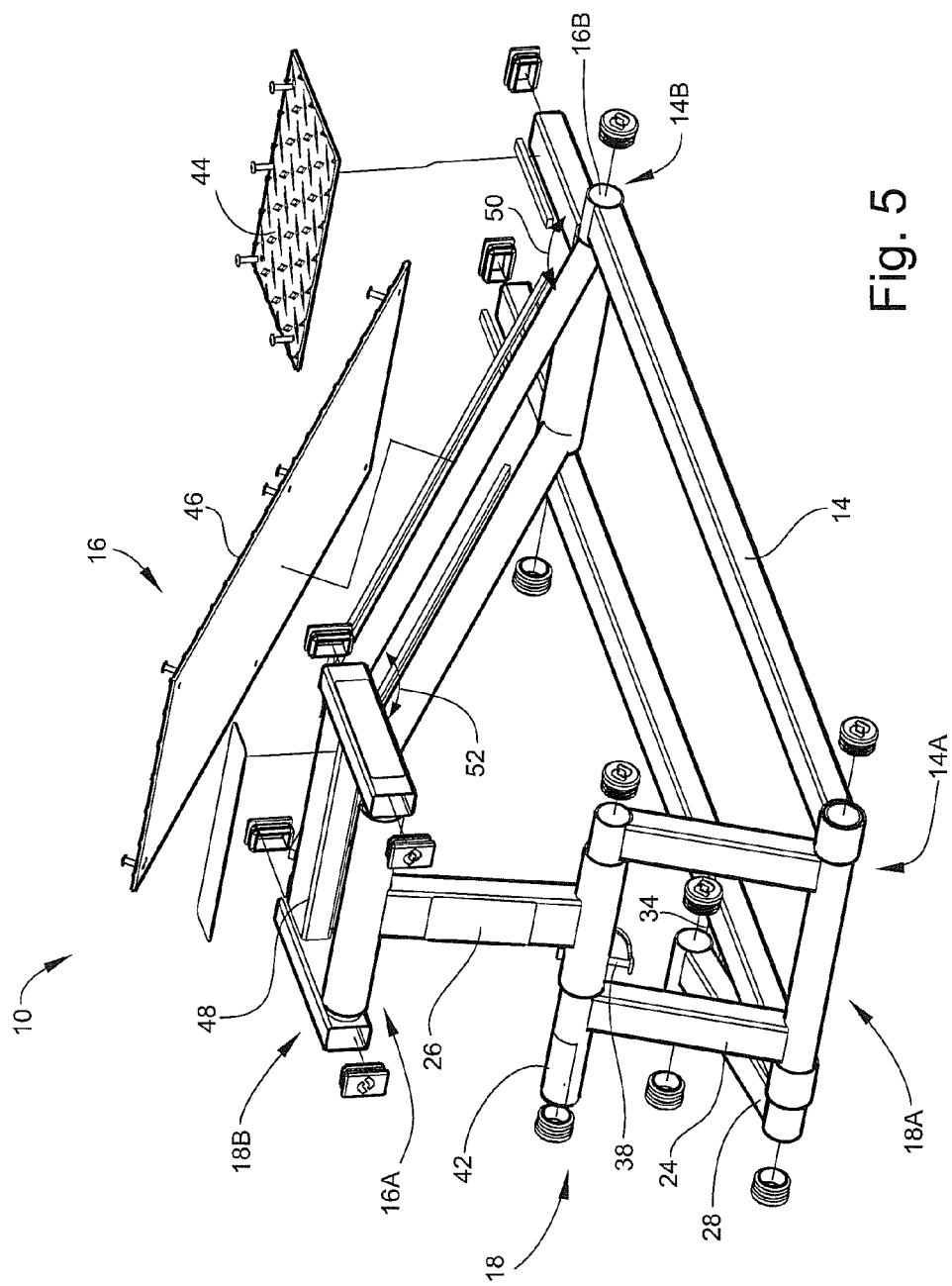
FIG. 5 is a fragmentary view of one embodiment of the vehicle lift.

Base 14 may be included in vehicle lift 10 (see FIG. 5). Base 14 may be for providing a stable foundation for vehicle lift 10. Base 14 may have a first end 14a and a second end 14b (see FIG. 5). Base 14 may be pivotally connected to ramp 16 at first end 14a and pivotally connected to lifting mechanism 18 at second end 14b. Base 14 may be any shape. Preferably, base 14 may be rectangular. Base 14 may be any size. Preferably, base 14 may be wide enough to provide stability to vehicle lift 10 when it is in raised position 22. Base 14 may be made out of a single member or may be made out of multiple members. Base 14 may be made of any material strong enough to be a stabile foundation for vehicle lift 10, including but not limited to, 1020 steel.

Figure 3:
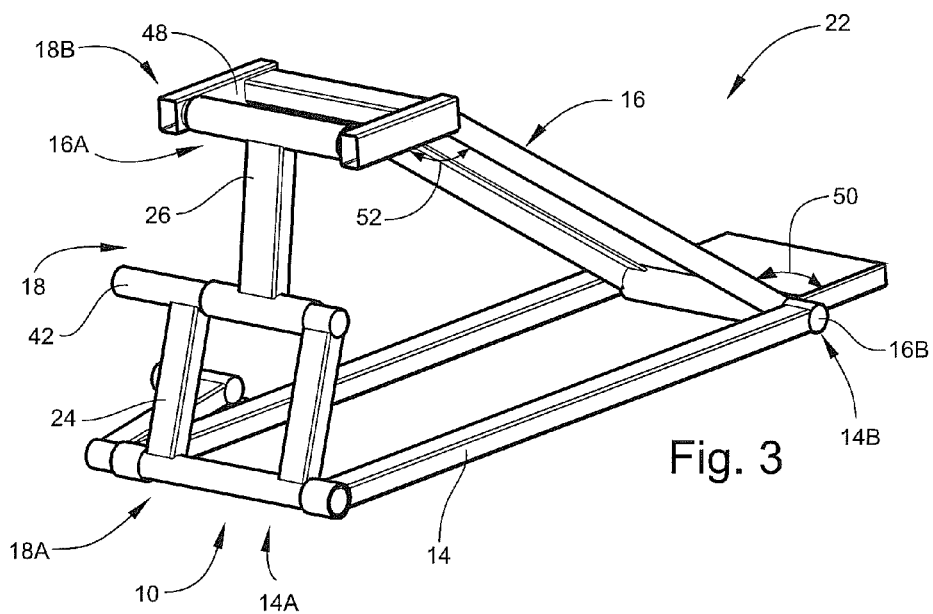
FIG. 3 is an isometric view of one embodiment of the vehicle lift in the raised position.

Lifting mechanism 18 may be included in vehicle lift 10 (see FIGS. 2 and 3). Lifting mechanism 18 may be for lifting vehicle lift 10 to raised position 22. For example, lifting mechanism 18 may be for lifting vehicle lift 10 from intermediate position 56 to raised position 22. Lifting mechanism 18 may be collapsed when vehicle lift 10 may be in lowered position 20 (FIG. 2) and may be extended when vehicle lift 10 may be in raised position 22 (FIG. 3). Lifting mechanism 18 may have a first end 18a and a second end 18b (see FIG. 5). Lifting mechanism 18 may be pivotally connected to base 14 at first end 18a and pivotally connected to ramp 16 at second end 18b. Lifting mechanism 18 may include lower arm 24, upper arm 26 and leverage arm 28 (see FIG. 5). Lifting mechanism 18 may also include a stopping mechanism 34, a first safety pin 38, and a lowering mechanism 42 (see FIG. 5).

Lower arm 24 and upper arm 26 may be included in lifting mechanism 18 (see FIG. 5). Lower arm 24 may be pivotally connected to base 14 at one end and pivotally connected to upper arm 26 at the other end. Upper arm 26 may be pivotally connected to lower arm 24 at one end and pivotally connected to ramp 16 at the other end. The pivotal connection between lower arm 24 and upper arm 26 provides the necessary extension and collapse for lifting mechanism 18. Lifting mechanism 18 may be collapsed when lower arm 24 is at an acute angle to upper arm 26 (see FIG. 2) and lifting mechanism 18 may be extended when lower arm 24 is at an obtuse angle to upper arm 26 (see FIG. 3). Thus, lifting mechanism 18 may be collapsed when lower arm 24 may be approximately horizontal, and may be extended when lower arm 24 may be approximately vertical. Lower arm 24 and upper arm 26 may be any shape. Preferably, lower arm 24 may be square shaped and upper arm 26 may be 'I' shaped, thereby allowing upper arm 26 to collapse on lower arm 24. Also, when vehicle lift 10 may be in the lowered position 20, upper arm 26 being 'I' shaped may provide a path for motorcycle 12 to be rolled onto vehicle lift 10. Lower arm 24 and upper arm 26 may be made as single members or may be made out of multiple members. Lower arm 24 and upper arm 26 may be made of any material strong enough to lift vehicle lift 10, including but not limited to, 1020 steel.

Leverage arm 28 may be included in lifting mechanism 18 (see FIG. 5). Leverage arm 28 may be for providing leverage for extending lifting mechanism 18. Leverage arm 28 may be rigidly connected to lower arm 24. Leverage arm 28 may extend lifting mechanism 18 by forcing lower arm 24 to rotate vertically, thereby raising vehicle lift 10 to raised position 22. Leverage arm 28 may be any shape. Leverage arm 28 may be 'L' shaped for providing a pedal for applying an external force, like the foot of the motorcycle rider pushing down on leverage arm 28. Leverage arm 28 may be made out of any material capable of providing enough force to raise vehicle lift 10, including but not limited to, 1020 steel.

Stopping mechanism 34 may be included in lifting mechanism 18 (see FIG. 4). Stopping mechanism 34 may be for preventing leverage arm 28 from rotating past a predetermined position. The predetermined position may be where vehicle lift 10 may be in raised position 22. The predetermined position may also be where the angle between lower arm 24 and upper arm 26 may be slightly past vertical, thereby preventing lower arm 24 and upper arm 26 from rotating back downwards in the other direction.

First safety pin 38 may be included in lifting mechanism 18 (see FIG. 5). First safety pin 38 may be for locking vehicle lift 10 in raised position 22. First safety pin 38 may be any device that may lock vehicle lift 10 in raised position 22. First safety pin 38 may be a pin that may be inserted through the pivotal connection between lower arm 24 and upper arm 26 when vehicle lift 10 may be in raised position 22, thereby fixing the angle between lower arm 24 and upper arm 26. A second safety pin may be included for locking vehicle lift 10 in lowered position 20 (not illustrated). The second safety pin may be a pin that may be inserted through the pivotal connection between lower arm 24 and upper arm 26 when vehicle lift 10 may be in lowered position 20, thereby fixing the angle between lower arm 24 and upper arm 26. First safety pin 38 may be used as the second safety pin.

Lowering mechanism 42 may be included in lifting mechanism 18 (see FIG. 5). Lowering mechanism 42 may be for lowering lifting mechanism 18. Lowering mechanism 42 may be any device for lowering lifting mechanism 18. Lowering mechanism 42 may be a bar extending outward from the pivotal connection of lower arm 24 to upper arm 26 for providing a surface for moving the pivotal connection of lower arm 24 to upper arm 26. Moving the pivotal connection may move the angle back before vertical and allow lifting mechanism 18 to fall back to intermediate position 56 or lowered position 20.

Ramp 16 may be included in vehicle lift 10 (see FIG. 5). Ramp 16 may be for providing a surface for motorcycle 12 to roll on vehicle lift 10. Ramp 16 may also provide a surface for vehicle lift 10 to lift motorcycle 12. Ramp 16 may have an end 16a and a connection point 16b (see FIG. 5). Ramp 16 may be pivotally connected to lifting mechanism 18 at end 16a and pivotally connected to base 14 at connection point 16b. Ramp 16 may be any size or shape. Ramp 16 may include a first platform 44, a second platform 46, and a third platform 48 (see FIG. 5). Ramp 16 may be flat or may include a first angular relationship 50, and a second angular relationship 52 (see FIG. 5). Connection point of ramp 16b may be the point of first angular relationship 50.

Figure 6A:
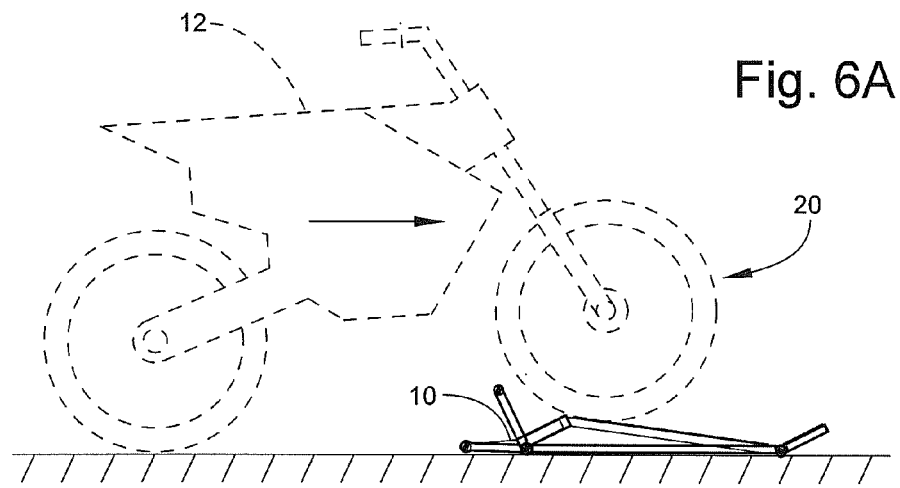
FIG. 6a is a side view of a motorcycle being rolled onto one embodiment of the vehicle lift in the lowered position.
Figure 6B:
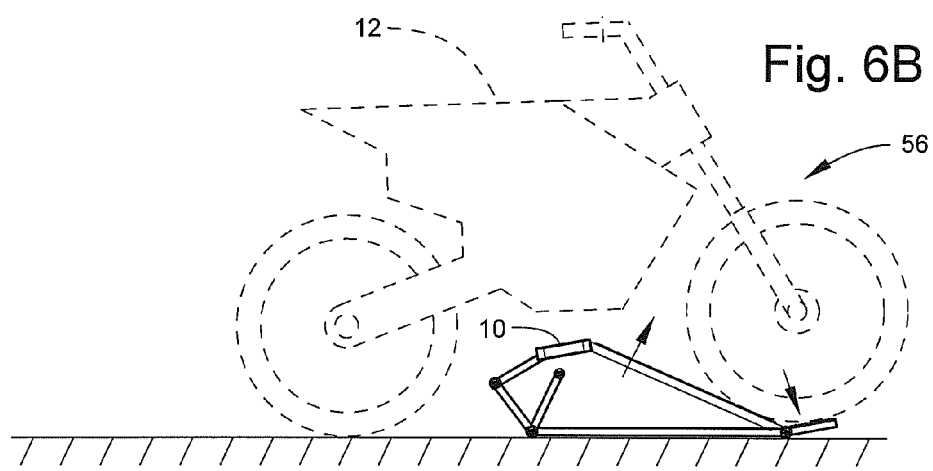
FIG. 6b is a side view of the motorcycle from FIG. 6a moving the vehicle lift to the intermediate position.
Figure 6C:
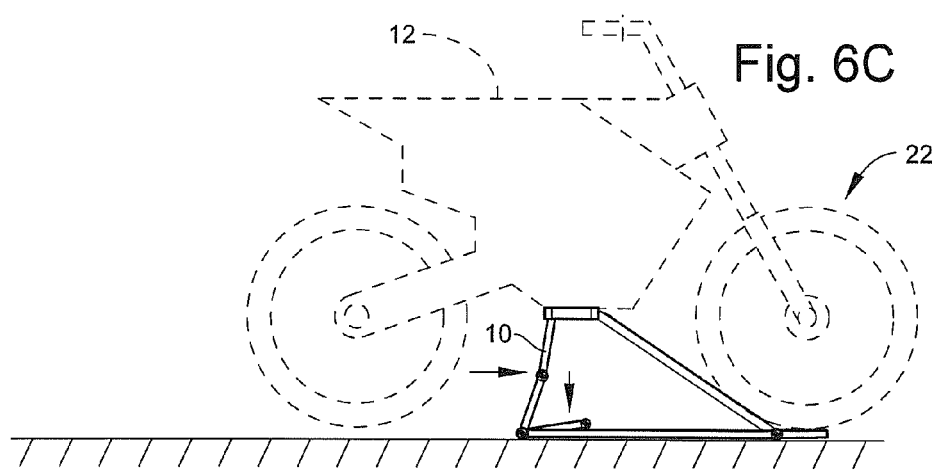
FIG. 6c is a side view of the motorcycle from FIG. 1 on the vehicle lift in the raised position.

First platform 44 may be for providing a surface for the front or rear wheel of motorcycle 12 to rest on when vehicle lift 10 may be in raised position 22 (see FIG. 6c). First platform 44 may also provide the surface for the front or rear wheel of motorcycle 12 to push against to raise vehicle lift 10 from lowered position 20 to intermediate position 56 (see FIGS. 4 and 6b). First platform 44 may be any shape, including, but not limited to, rectangular. First platform 44 may be made of any material capable of supporting the front or rear wheel of motorcycle 12 and raising vehicle lift 10 from lowered position 20 to intermediate position 56. First platform 44 may include an aluminum diamond plated material.

Second platform 46 may be for connecting first platform 44 to third platform 48 by providing a surface for the front or rear wheel of motorcycle 12 to roll from third platform 48 to first platform 44 (see FIG. 5). Second platform 46 may be any shape, including but not limited to, rectangular. Second platform 46 may be any size. Preferably, second platform 46 may be the length required for the front or rear wheel of motorcycle 12 to rest on first platform 44 and for the undercarriage of motorcycle 12 to rest on third platform 48. Second platform 46 may be made of any material capable of supporting the front or rear wheel of motorcycle 12. Second platform 46 may include an aluminum diamond plated material.

Third platform 48 may be for supporting the undercarriage of motorcycle 12 when vehicle lift 10 may be in raised position 22 (see FIG. 6c). Third platform 48 may also be for providing a surface for the front or rear wheel of motorcycle 12 to roll from upper arm 26 to second platform 46. Third platform 48 may be any shape, including, but not limited to, rectangular. Third platform 48 may be any size. Preferably, third platform 48 may be wide enough and long enough to stabilize motorcycle 12 by its undercarriage. Third platform 48 may include a friction surface for providing added stability to motorcycle 12 by preventing the undercarriage of motorcycle 12 from slipping off vehicle lift 10.

First angular relationship 50 may be included in ramp 16 (see FIG. 5). First angular relationship 50 may be the angle between first platform 44 and second platform 46. First angular relationship 50 may be located at connection point 16b where ramp 16 may be pivotally connected to base 14. First angular relationship 50 may provide the angle between first platform 44 and second platform 46 that allows the front or rear wheel of motorcycle 12 to push on the top side of first platform 44 and raise vehicle lift 10 from lowered position 20 to intermediate position 56.

Second angular relationship 52 may be included in ramp 16 (see FIG. 5). Second angular relationship 52 may be the angle between second platform 46 and third platform 48. Second angular relationship 52 may allow third platform 48 to be horizontal when vehicle lift 10 may be in raised position 22, thereby providing a level surface for the undercarriage of motorcycle 12.

First angular relationship 50 and second angular relationship 52, in combination, may allow first platform 44 and third platform 48 to be parallel (see FIG. 3). This combination may allow first platform 44 and third platform 48 to be horizontal when vehicle lift 10 may be in raised position 22, thereby providing a level surface for the front or rear wheel and undercarriage of motorcycle 12.

In operation, when vehicle lift 10 may be in lowered position 20, motorcycle 12 may be positioned onto vehicle lift 10 (see FIG. 6a). Preferably, motorcycle 12 may be rolled onto vehicle lift 10 by either driving it onto vehicle lift 10 or by pushing or pulling it onto vehicle lift 10. Motorcycle 12 may be rolled onto vehicle lift 10 by rolling the front or rear wheel onto the 'I' of upper arm 26, over third platform 48, over second platform 46, and up to first platform 44. The force of the front or rear wheel of motorcycle 12 pushing against the top side of first platform 44, may force vehicle lift 10 to raise from lowered position 20 to intermediate position 56 where third platform 48 may contact the undercarriage of motorcycle 12 (see FIG. 6b).

Once in intermediate position 56, an external force may be applied to the top side of leverage arm 28. Preferably, this force may be applied by the foot of the person who rode or pushed motorcycle 12 onto vehicle lift 10. If the rider rode motorcycle 12 onto vehicle lift 10, as the rider dismounts motorcycle 12, he/she may step off motorcycle 12 onto leverage arm 28 to provide the necessary force. This force will rotate leverage arm 28 towards the ground which will, in turn, rotate lower arm 24 vertically upward. Lower arm 24 rotating vertically upward will extend lifting mechanism 18 and lift vehicle lift 10 to raised position 22. Thus, third platform 48 will lift the undercarriage of motorcycle 12 (see FIG. 6c).

Once vehicle lift 10 is in raised position 22, stopping mechanism 34 will prevent leverage arm 28 from rotating any further and will secure vehicle lift 10 in raised position 22. With the raised position 22 being where the angle between lower arm 24 and upper arm 26 is slightly past vertical, the weight of motorcycle 12 and ramp 16, in combination with lower arm 24 not being able to rotate any further past vertical from stopping mechanism 34, secures vehicle lift 10 into raised position 22. First safety pin 38 may be inserted to lock vehicle lift 10 into raised position 22 (see FIG. 5).

Lowering vehicle lift 10 may be accomplished after first safety pin 38 may be removed by applying a horizontal force away from vehicle lift 10 to lowering mechanism 42. The horizontal force away from vehicle lift 10 will force lower arm 24 to rotate from slightly past vertical, to back before vertical. Once lower arm 24 may be back before vertical, the weight of motorcycle 12 and ramp 16 may force vehicle lift 10 to fall from raised position 22 to intermediate position 56.

Once in intermediate position 56, motorcycle 12 may be removed from vehicle lift 10. Preferably, the front or rear wheel of motorcycle 12 may be rolled backwards off of first platform 44 which will allow vehicle lift 10 to fall from intermediate position 56 to lowered position 20. The front or rear wheel of motorcycle 12 may now be rolled backwards off of vehicle lift 10. First safety pin 38 may be inserted to lock vehicle lift 10 into lowered position 20, where vehicle lift 10 may easily be moved from one destination to the next.

The present invention may be embodied in other forms without departing from the spirit and the essential attributes thereof, and, accordingly, reference should be made to the appended claims, rather than to the foregoing specification, as indicated in the scope of the invention.

We claim:

1. A lift for a vehicle comprising:
   a base having a first end and a second end;
   a ramp having an end and a connection point being pivotally connected to said first end of said base; and
   a lifting mechanism adapted for raising said vehicle while said vehicle being on said ramp having a first end pivotally connected to said second end of said base and a second end pivotally connected to said end of said ramp;
   said lifting mechanism comprising:
      a lower arm having two ends, said first end being pivotally connected to said second end of said base and said second end being pivotally connected to an upper arm;
      said upper arm having two ends, said first end being pivotally connected to said lower arm, and said second end being pivotally connected to said ramp;
      a leverage arm rigidly connected to said lower arm;
      when said leverage arm being rotated, then said lower arm rotates upward forcing said ramp to raise from said lowered position to said raised position;
   said lift being in a lowered position, when said lifting mechanism being collapsed; and
   said lift being in a raised position when said lifting mechanism being extended.

2. The lift of claim 1 where said lifting mechanism being collapsed when said lower arm being approximately horizontal.

3. The lift of claim 1 where said lifting mechanism being extended when said lower arm being approximately vertical.

4. The lift of claim 1 where the lifting mechanism further comprising a stopping mechanism;
said stopping mechanism being adapted to stop said leverage arm from rotating said lower arm past a predetermined position.

5. The lift of claim 4 where said predetermined position being when said ramp being in said raised position.

6. The lift of claim 4 where said stopping mechanism being mounted on said base.

7. The lift of claim 1 where said lifting mechanism further comprising a first safety pin being adapted to fix said lower arm to said upper arm in said raised position.

8. The lift of claim 1 where said lifting mechanism further comprising a second safety pin being adapted to fix said lower arm to said upper arm in said lowered position.

9. The lift of claim 1 where said vehicle lift further comprising a lowering mechanism mounted to the exterior of said lifting mechanism;
when said lowering mechanism being moved in one direction, said lowering mechanism being adapted to cause said lifting mechanism to collapse from said raised position to said lowered position.

10. The lift of claim 1 where said ramp comprising:
a first platform;
a second platform; and
a third platform;
said first and second platforms being fixed at a first angular relationship;
said first angular relationship being at said connection point;
said second and third platforms being fixed at a second angular relationship; and
said ramp being pivotally connected to said lifting mechanism at the terminal end of said third platform.

11. The lift of claim 10 where said first platform and said third platform being parallel.

12. The lift of claim 10 being adapted to rise from said lowered position to an intermediate position when an external force is applied to a top side of said first platform.

13. The lift of claim 12 where said intermediate position being where said third platform being in contact with the undercarriage of the vehicle.

14. A lift for a vehicle comprising:
a base having a first end and a second end;
a ramp having an end and a connection point being pivotally connected to said first end of said base; and
a lifting mechanism adapted for raising said vehicle while said vehicle being on said ramp having a first end pivotally connected to said second end of said base and a second end pivotally connected to said end of said ramp;
said ramp comprising:
a first platform;
a second platform; and
a third platform;
said first and second platforms being fixed at a first angular relationship;
said first angular relationship being at said connection point;
said second and third platforms being fixed at a second angular relationship; and
said ramp being pivotally connected to said lifting mechanism at the terminal end of said third platform;
said lift being in a lowered position, when said lifting mechanism being collapsed; and
said lift being in a raised position when said lifting mechanism being extended.

15. The lift of claim 14 where said first platform and said third platform being parallel.

16. The lift of claim 14 being adapted to rise from said lowered position to an intermediate position when an external force is applied to a top side of said first platform.

17. The lift of claim 16 where said intermediate position being where said third platform being in contact with the undercarriage of the vehicle.

18. The lift of claim 14 where said lifting mechanism comprising:
a lower arm having two ends, said first end being pivotally connected to said second end of said base and said second end being pivotally connected to an upper arm;
said upper arm having two ends, said first end being pivotally connected to said lower arm, and said second end being pivotally connected to said ramp;
a leverage arm rigidly connected to said lower arm;
when said leverage arm being rotated, then said lower arm rotates upward forcing said ramp to raise from said lowered position to said raised position.

19. The lift of claim 14 where the lifting mechanism further comprising a stopping mechanism;
said stopping mechanism being adapted to stop said leverage arm from rotating said lower arm past a predetermined position.

20. The lift of claim 14 where said vehicle lift further comprising a lowering mechanism mounted to the exterior of said lifting mechanism;
when said lowering mechanism being moved in one direction, said lowering mechanism being adapted to cause said lifting mechanism to collapse from said raised position to said lowered position.

* * * * *